United States Patent [19]

Benecke

[11] Patent Number: 5,172,950
[45] Date of Patent: Dec. 22, 1992

[54] MICROMANIPULATOR FOR GRIPPING OBJECTS

[75] Inventor: Wolfgang Benecke, Berlin, Fed. Rep. of Germany

[73] Assignee: Fraunhofer Gesellschaft zur Forderung der angewandten Forschung e.V., Fed. Rep. of Germany

[21] Appl. No.: 601,750

[22] PCT Filed: Apr. 27, 1989

[86] PCT No.: PCT/DE89/00270
§ 371 Date: Oct. 26, 1990
§ 102(e) Date: Oct. 26, 1990

[87] PCT Pub. No.: WO89/10243
PCT Pub. Date: Nov. 2, 1989

[30] Foreign Application Priority Data
Apr. 29, 1988 [DE] Fed. Rep. of Germany ....... 3814617

[51] Int. Cl.[5] .............................................. B25J 15/12
[52] U.S. Cl. ................................. 294/86.4; 294/902; 294/99.1
[58] Field of Search ................... 294/86.4, 99.1, 907, 294/902, 1.1

[56] References Cited

U.S. PATENT DOCUMENTS 4,610,475 9/1986 Heiserman .
4,666,198 5/1987 Heiserman ........................ 294/86.4
4,765,139 8/1988 Wood .

FOREIGN PATENT DOCUMENTS 215666 11/1984 Fed. Rep. of Germany ..... 294/86.4
3809597 10/1989 Fed. Rep. of Germany .
862174 3/1961 United Kingdom .

OTHER PUBLICATIONS

"International Symposium on Industrial Robots" (vol. 1, 1978, pp. 406–410).
IBM Technical Disclosure Bulletin, vol. 25, No. 8, Jan. 1983, pp. 4443–4444 Bimetal Wire Gripper, C. A. Gaston & D. L. Wilson.

Primary Examiner—Charles A. Marmor
Assistant Examiner—Dean J. Kramer
Attorney, Agent, or Firm—Evenson, Wands, Edwards, Lenahan & McKeown

[57] ABSTRACT

A gripping device for gripping microscopically small objects for fine-mechanical precision uses a basic body and gripping elements. The basic body consists of one or more semiconductor chips. Thin layer tongues of silicon and metal are precipitated and vapor deposited, respectively, on the body and are equipped with layer-shaped heating elements on or between the tongues for changing temperature and moving a held object.

26 Claims, 2 Drawing Sheets

MICROMANIPULATOR FOR GRIPPING OBJECTS

BACKGROUND AND SUMMARY OF THE INVENTION

The present invention relates to a gripping device having a basic body and gripping elements and more particularly, to a gripping device that can be made simply and is particularly suited for small objects.

Gripping devices of this general type are employed, for example, in robot technology and are described in numerous publications. An object to be gripped is mechanically clamped between two gripping elements and then, for example, held or transported to another position. Gripping elements for gripping microscopically small objects require greater fine-mechanical precision.

In addition to mechanical gripping elements, electromagnetic elements are often used. The object is held by magnetic forces which, by way of illustration, are produced with an electromagnetic coil. Although gripping devices of this type are able to operate without mechanical elements, they can only be used with magnetizable objects.

Mechanical gripping devices have gripping elements, which either must be movable (clamping jaws) or hinged (gripping fingers), and require a mechanical or electromechanical drive device. Such gripping devices are also subject to mechanical wear and tear.

Furthermore, because mechanical gripping elements require lubrication, they can, therefore, only be utilized to a limited degree under sterile or vacuum conditions.

IBM Technical Disclosure Bulletin (Vol. 25, No. 8, 1983, p. 4443), shows a gripping device which has a bimetal gripping arm. Upon suitable changes in temperature, this gripping arm bends in the direction of a stationary gripping arm and thereby clamps the object to be gripped between both gripping arms.

All the described gripping arms have limitations when it comes to gripping microscopic objects, as the fine-mechanical processes required for manufacturing the arms grow more and more complicated with increasing miniaturization and entail high costs.

An object of the present invention is to provide a simple gripping device that can be made without complicated fine-mechanical processes and is suited for gripping microscopically small objects ($\mu$m range).

The aforesaid object has been achieved in accordance with the present invention by a gripping device in which the basic body consists of one or several semiconductor chips, and tongues are each composed of thin layers which are made with the aid of precipitation of vapor deposition processes. For changing the temperature, the tongues are equipped with layer-shaped heating elements applied onto or between the layers of the tongues.

It should be clearly understood that the gripping device can be fabricated in different sizes. As it does not require mechanical drive devices, the gripping device of the present invention is especially suited for miniaturization. Thus, it meets the demands of ever smaller handling systems, which are increasing with the growth of microtechnoloqy. Whereas the known gripping devices have limitations set by fine-mechanical manufacturing procedures, the gripping devices according to the present invention can be conducted in dimensions of several hundred micrometers with known microstructure technology methods.

The elements for heating the tongues are electric resistances and arranged between or on the layers of the tongues. The basic material for the basic body of the gripping device can be silicon wafers which have found wide application in microelectronics.

In order to be able to move the tongues at the lowest possible heat level, the tongues are made of a combination of materials having thermal expansion coefficients as different as possible. With the use of a silicon compound (e.g. silicon nitrite or silicon dioxide), microstructure methods have found application in the fabrication of particularly small-dimensioned gripping devices.

In order to be able to put the gripping elements in a predeterminable position and in order to avoid the ambient temperature from influencing the position of the gripping elements, one especially favorable arrangement attaches sensor elements to the tongues for detecting the momentary position and for controlling the position. The function of the sensor elements can be based on various physical effects. The use of piezoresistances is especially advantageous as the static piezoresistant effect is particularly pronounced with silicon and the position of the tongues can be determined immediately by measuring the pull and pressure force. Another advantage is that the piezoresistances can be easily fabricated with the aid of the conventional methods employed in microelectronics.

Heating and sensor signals can be linked in common control circuits, thereby permitting, by way of illustration, the tongues to be kept in the predeterminable positions by regulating the heat level. In this manner, the movement of the two corresponding tongues and also that of several gripping elements can be coordinated, thereby ensuring the handling cf large and complex objects. The design and effect of the individual gripping elements corresponds to the controllable position-changing element, which is described in the unpublished Patent Application DE 38 09 597.1. In order to achieve an especially high degree of miniaturized, the control circuits and the gripping devices can each be also be fabricated simultaneously.

Another advantageous feature of the present invention concerns the basic body which is composed of two silicon chips each carrying a tongue and joined via a spacer plate. The gripping device can be adjusted to the size of the object to be moved by the thickness of the spacer plate.

A presently preferred embodiment of the present invention is distinguished by having an especially simple build-up. Three tongues, which grasp the object to be moved by suitable steering, are attached to the basic body, which is made up of only one silicon chip.

The hereinafter described further features of the present invention are advantageously fabricated with known micromechanics and micro-electronics processes, and are compatible with standard IC processes. The individual components are structured with the aid of planar lithographic processes. The voltage levels common in microelectronics suffice for operating a gripping device.

The gripping device of the present invention is distinguished by having a high degree of miniaturization, high precision, great reliability and low costs. The extreme degree of miniaturization permits utilizing the gripping device for handling microscopic objects, e.g., in processing and analyzing objects in microtechnology or in microbiology. The gripping device is particularly suited for handling objects of this kind in closed systems in which mechanical operation must be avoided, by way of illustration, in ultra-high vacuum apparatuses.

BRIEF DESCRIPTION OF THE DRAWINGS

These and other objects, features and advantages of the present invention will become more apparent from the following detailed description of the presently preferred embodiments when taken in conjunction with the accompanying drawings wherein:

FIGS. 1A and 1B are schematic representations of a gripping device of the present invention composed of two chips, with the tongues closed and opened, respectively, in which FIG. 1A shows the heating element on the layer of the tongues and FIG. 1B shows the heating element between the layers of the tongues.

DETAILED DESCRIPTION OF THE DRAWINGS

Figure 1A:
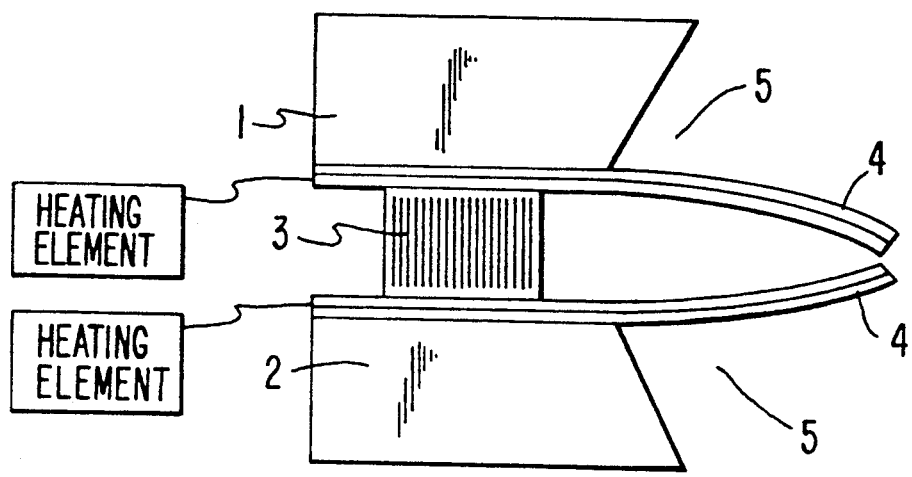

The basic body of the gripping device in FIG. 1A comprises two single-crystalline silicon chips 1, 2 (e.g., 100-orientation, thickness of approximately 0.5 mm), which are connected via a spacer plate 3. The spacer plate, which may be made of silicon or glass, is joined to the silicon chips, for example, with a gluing technique. The thickness of the chips 1, 2 is adjusted to the size of the objects to be gripped and lies between several micrometers up to several millimeters.

In order to fabricate tongues 4 (length up to several hundred micrometers), a silicon layer is precipitated onto the surface of each silicon chip 1, 2. A metal layer (preferably gold) is vacuum deposited on top of the silicon layer as a second layer. The geometry of the tongue is structured by lithographic processes. The tongues are subsequently laid bare on one side with the aid of anisotropic etching steps while forming etch pits 5.

The metal layer can be applied by a suitable vapor deposition technique such that it exerts a pull tension on the silicon layer and tongues 4 protrude through the etch pits 5 in a resting position (i.e., without energy feed-in) as shown in FIG. 1A. If the two chips 1, 2 with the tongues 4 are applied mirror symmetrically in relation to the spacer plate 3, the gripping device is closed in the resting position as illustrated.

Figure 1B:
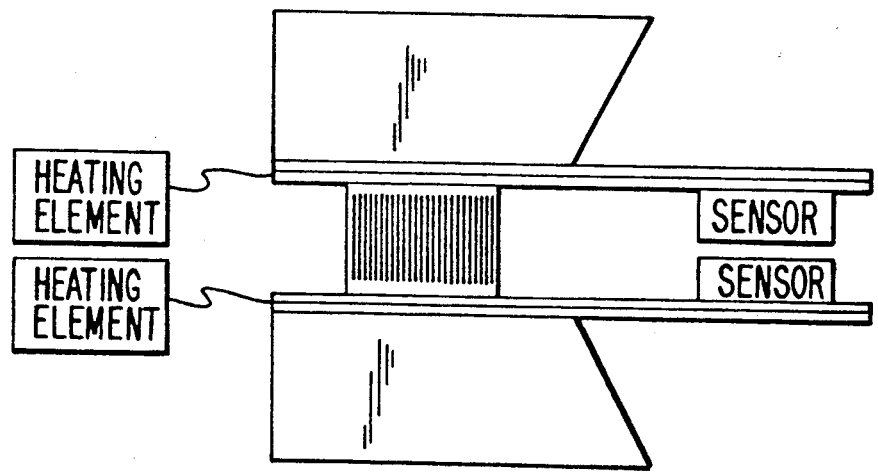

By feeding in thermal energy via heating elements applied onto or between the layers of the tongues, the tongues 4 are bent due to the bimaterial structure in such a manner that the gripping device is forced into the open position illustrated in FIG. 1B. With the aid of known sensor elements which operate based upon piezoresistive, magnetic, piezoelectric, ferroelectric or capacitative effects (not shown), the tongue 4 can be positioned in a predeterminable position, thereby determining the size of the opening and the force, with which the object is being held.

Figure 2A:
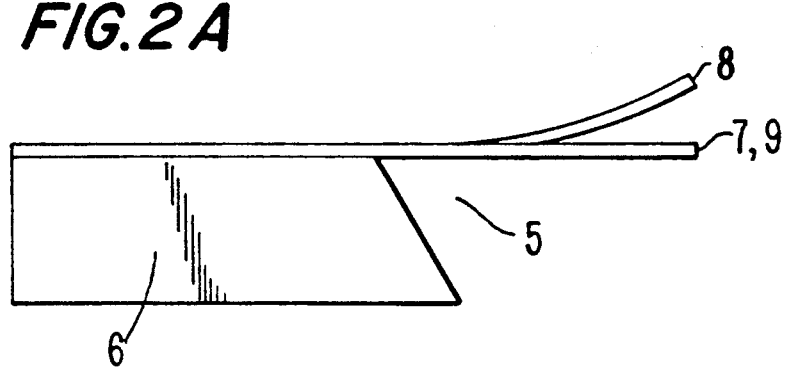
FIGS. 2A and 2B are schematic representations of a gripping device according to another embodiment composed of one chip, showing a lateral view and a top view, respectively of the device.
Figure 2B:
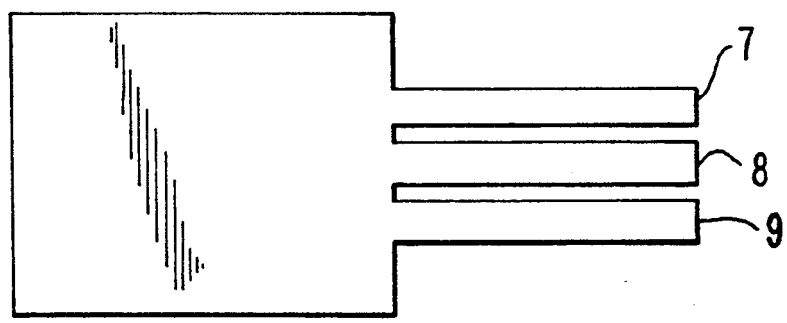

FIGS. 2A and 2B are a lateral view and a top view, respectively, of a preferred embodiment of particularly simple build-up. The gripping device comprises only one chip 6 and three parallel tongues 7, 8, 9. In the simplest case, the middle tongue 8 is built up of two layers, whereas tongues 7 and 9 consist of only one layer of silicon or silicon compound. By moving the bimaterial tongue 8 in relation to tongues 7 and 9, an object can be selectively held and let loose. If all three tongues 7, 8, 9 are built up of bimaterial and steered individually, the flexibility of the gripping device increases. By way of illustration, an object can be turned in this way in that the three tongues 7, 8, 9 are steered in such a way that their loose ends lay practically in one plane, which is slanted in relation to the surface of the basic body 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gripping device for gripping microscopically small objects comprising at least one basic body and gripping elements, said gripping elements being in the form of tongues attached at one side of said at least one basic body; said tongues consisting of layers of different materials with varying thermal expansion arranged on top of each other, one of said materials being one of silicon and a silicon compound, wherein
   said at least one basic body comprises at least one semi-conductor chip,
   said tongues are each composed of thin layers of the different materials produced with a deposition process, and
   for changing the temperature, said tongues are operatively associated with heating element layers being one of on and between the layers of said tongues.

2. A gripping device according to claim 1, wherein said heating elements are operable to cause reheating via their electric resistances.

3. A gripping device according to claim 1, wherein said basic body is comprised of silicon wafer material.

4. A gripping device according to claim 3, wherein said heating elements are electric resistance heaters.

5. A gripping device according to claim 1, wherein said tongues each comprise a metal layer adjoining a layer comprised of one of said silicon and silicon compound.

6. A gripping device according to claim 5, wherein said heating elements are operable to cause heating via their electric resistances.

7. A gripping device according to claim 6, wherein said basic body is comprised of silicon wafer material.

8. A gripping device according to claim 1, wherein sensor elements are operatively connected with said tongues for detecting and regulating a position, said sensor elements being operatively based on one of piezoresistively magnetic, piezo-electric, ferroelectric and capacitative effects.

9. A gripping device according to claim 8, wherein said heating elements and said sensor elements are operatively linked via a common electric control circuit.

10. A gripping device according to claim 8, wherein said heating elements are electric resistance heaters.

11. A gripping device according to claim 10, wherein said basic body is comprised of silicon wafer material.

12. A gripping device according to claim 11, wherein said tongues each consist of a metal layer and one of a layer of silicon and a silicon compound.

13. A gripping device according to claim 1, wherein the tongues and heating elements are integrated on the semiconductor chip.

14. A gripping device according to claims 1 to 7, wherein said at least one basic body comprises two silicon chips joined via a spacer plate.

15. A gripping device according to claim 14, wherein said heating elements are electric resistance heaters.

16. A gripping device according to claim 15, wherein said basic body is comprised of silicon wafer material.

17. A gripping device according to claim 16, wherein said tongues each consist of a metal layer and one of a layer of silicon and a silicon compound.

18. A gripping device according to claim 17, wherein sensor elements are operatively connected with said tongues for detecting and regulating a position, said sensor elements being operatively based on one of piezoresistivity, magnetic, piezo-electric, ferroelectric and capacitative effects.

19. A gripping device according to claim 18, wherein said heating elements and said sensor elements are operatively linked via a common electric control circuit.

20. A gripping device according to claim 1, wherein said basic body comprises one silicon chip provided with three tongues, of which at least one tongue comprises a bimaterial having materials with different thermal expansion coefficient.

21. A gripping device according to claim 20, wherein said heating elements are electric resistance heaters.

22. A gripping device according to claim 21, wherein said basic body is comprised of silicon wafer material.

23. A gripping device according to claim 22, wherein said tongues each consist of a metal layer and one of a layer of silicon and a silicon compound.

24. A gripping device according to claim 23, wherein sensor elements are operatively connected with said tongues for detecting and regulating a position, said sensor elements being operatively based on one of piezoresistivity, magnetic, piezo-electric, ferroelectric and capacitive effects.

25. A gripping device according to claim 24, wherein said heating elements and said sensor elements are operatively linked via a common electric control circuit.

26. A gripping device according to claim 25, wherein each of the aforementioned components are integrated on a semiconductor chip.

* * * * *